(12) United States Patent
Drescher et al.

(10) Patent No.: US 10,832,395 B2
(45) Date of Patent: Nov. 10, 2020

(54) SYSTEMS AND METHODS FOR INSPECTING BRISTLES USING A DIGITAL CAMERA

(71) Applicant: United Technologies Corporation, Farmington, CT (US)

(72) Inventors: Joseph D. Drescher, Middletown, CT (US); Kamiko L. Darrow, Weston, MA (US); Brian Duguay, Berwick, ME (US); Erik M. Pedersen, Cheshire, CT (US); Brian Ricciardelli, South Windsor, CT (US); Danielle N. Balzano, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/363,545

(22) Filed: Mar. 25, 2019

(65) Prior Publication Data

US 2020/0311908 A1    Oct. 1, 2020

(51) Int. Cl.
| | | |
|---|---|---|
| G03G 15/16 | (2006.01) |
| G06T 7/00 | (2017.01) |
| G01N 21/88 | (2006.01) |
| G06T 7/73 | (2017.01) |
| H04N 5/247 | (2006.01) |
| F16J 15/3288 | (2016.01) |

(52) U.S. Cl.
CPC ....... *G06T 7/0006* (2013.01); *G01N 21/8851* (2013.01); *G06T 7/001* (2013.01); *G06T 7/74* (2017.01); *H04N 5/247* (2013.01); *F16J 15/3288* (2013.01); *G01N 2021/8887* (2013.01); *G06T 2207/30164* (2013.01)

(58) Field of Classification Search
CPC .......... F02C 7/28; F01D 25/10; G01N 21/88; G01M 15/02
USPC ........................ 348/82–86; 415/47, 48, 170.1
See application file for complete search history.

(56) References Cited

U.S. PATENT DOCUMENTS

| | | | |
|---|---|---|---|
| 6,220,814 B1 * | 4/2001 | Brushwood ........... | F01D 11/001 219/201 |
| 6,880,829 B1 | 4/2005 | Datta | |
| 2002/0012455 A1 * | 1/2002 | Benckert ............ | G06K 9/00026 382/124 |
| 2006/0064988 A1 * | 3/2006 | Ingistov ................ | F01D 11/001 60/805 |

(Continued)

FOREIGN PATENT DOCUMENTS

| | | |
|---|---|---|
| CN | 107907216 B | 6/2019 |
| GB | 2400893 | 6/2005 |

(Continued)

OTHER PUBLICATIONS

EP search report for EP20165709.5 dated Aug. 25, 2020.

*Primary Examiner* — Hee-Yong Kim
(74) *Attorney, Agent, or Firm* — Getz Balich LLC

(57) ABSTRACT

A method is provided for inspecting a device comprising a plurality of bristles. During this method, image data provided from an electronic optical sensor is received. The image data is indicative of an image of at least a portion of the bristles. A bristle configuration (e.g., an angle) of at least one of the bristles (e.g., an average bristle) in the image is determined by processing the image data with a computer processor.

20 Claims, 12 Drawing Sheets

(56) References Cited

U.S. PATENT DOCUMENTS

2007/0014597 A1* 1/2007 Ishii .................. G03G 15/1685
399/310
2015/0092039 A1* 4/2015 Ruhge .................... G01B 21/16
348/82

FOREIGN PATENT DOCUMENTS

JP          04335144      11/1992
WO         9714897 W      4/1997

* cited by examiner

SYSTEMS AND METHODS FOR INSPECTING BRISTLES USING A DIGITAL CAMERA

BACKGROUND OF THE DISCLOSURE

1. Technical Field

This disclosure relates generally to non-contact inspection and, more particularly, to systems and methods for inspecting bristles using a digital camera.

2. Background Information

A gas turbine engine may include a brush seal for sealing a gap between a stationary component and a rotating component. A typical brush seal includes a base and a plurality of bristles connected to and projecting out from the base. These bristles may each be oriented at an angle; e.g., each bristle may project along a trajectory with a radial and circumferential component. During inspection of a brush seal, the angles of the bristles are typically determined manually using, for example, a transparent protractor. However, such a manual inspection process is subjective, time consuming and is typically not repeatable. There is a need in the art therefore for improved systems and methods for inspecting a brush seal and, in particular, automatically determining bristle configurations (e.g., the angles) of the brush seal bristles.

SUMMARY OF THE DISCLOSURE

According to an aspect of the present disclosure, a method is provided for inspecting a device comprising a plurality of bristles. During this method, image data provided from an electronic optical sensor is received. The image data is indicative of an image of at least a portion of the bristles. A bristle configuration of at least one of the bristles in the image is determined by processing the image data with a computer processor.

According to another aspect of the present disclosure, another method is provided for inspecting a brush seal, or any other device with bristles. During this method, the brush seal is disposed with a fixture. The brush seal includes an annular base and a plurality of bristles projecting from the annular base. The brush seal is abutted against one or more surfaces of the fixture to position the brush seal in a known location and orientation relative to a digital camera. An image of at least a portion of the plurality of bristles is captured using the digital camera to provide image data indicative of the captured image. The image data is processed with a computer processor to determine an angle of at least one of the plurality of bristles relative to a predetermined reference line.

According to still another aspect of the present disclosure, a system is provided for inspecting a brush seal, or any other device with bristles. The system includes a brush seal support, a support stand, an optical sensor and a computer. The brush seal support includes a support surface and a plurality of protrusions. The support surface is configured to support the brush seal during the inspection. The plurality of protrusions are configured to abut against an edge of the annular brush seal to position the brush seal on the support surface in a known location and orientation. The support stand is connected to the brush seal support. The optical sensor is mounted to the support stand. The optical sensor is configured to capture an image of at least a portion of a plurality of bristles of the brush seal and provide image data indicative of the captured image. The computer is in signal communication with the optical sensor. The computer includes a processor. The computer is configured to receive the image data from the optical sensor and determine a bristle configuration of at least one of the bristles in the image by processing the image data with the processor.

The bristle configuration may be an average bristle configuration of at least some or all of the bristles in the captured image.

The bristle configuration may be or indicative of at least an angle between the at least one of the bristles and a predetermined reference line.

The bristle configuration may be or indicative of at least a dimension of the at least one of the bristles.

A first of the protrusions may be configured as or otherwise include a roller.

The optical sensor may be adapted to move between different positions associated with different brush seal configurations.

The device may include an annular base that extends circumferentially around a centerline. The plurality of bristles may be connected to and project from the annular base. The determining of the bristle configuration may include determining an angle between the at least one of the bristles and a reference line.

The reference line may be coincident with and perpendicular to the centerline.

The plurality of bristles may project radially inward from a radial inner periphery of the annular base.

The plurality of bristles may project radially outward from a radial outer periphery of the annular base.

The plurality of bristles may project axially away from an axial side of the annular base.

The determining of the bristle configuration may include: (A) calculating an autocorrelation function on an array of pixels of the image; (B) determining a peak intensity of the autocorrelation function along each row or each column of the array of pixels; (C) fitting a least square error line based on the peak intensity; and (D) determining the angle based on a slope of the least square error line.

The determining of the bristle configuration may include: (A) determining a first number of the plurality of bristles located along an x-axis in a quadrant of the image; (B) determining a second number of the plurality of bristles located along a y-axis in the quadrant of the image; and (C) calculating an arctangent of R to determine the angle, wherein R is equal to a quotient of the second number divided by the first number.

The method may also include arranging the device with a fixture to locate the device in a known spatial location and orientation. The bristle configuration is determined based on the known spatial location and orientation.

The electronic optical sensor may be fixedly mounted to the fixture.

The electronic optical sensor may be mounted to the fixture. The electronic optical sensor may be adapted to move relative to the device.

The method may also include adjusting the location of the electronic optical sensor based on a configuration of the device.

The fixture may include a first seal locator and a second seal locator. The device may be abutted against the first seal locator and/or the second seal locator.

The method may also include adjusting a location of the first seal locator and/or a location of the second seal locator based on a configuration of the device.

The bristle configuration may be determined using an autocorrelation function.

The device may be configured as a brush seal for a gas turbine engine.

The foregoing features and the operation of the invention will become more apparent in light of the following description and the accompanying drawings.

DETAILED DESCRIPTION

Figure 1:
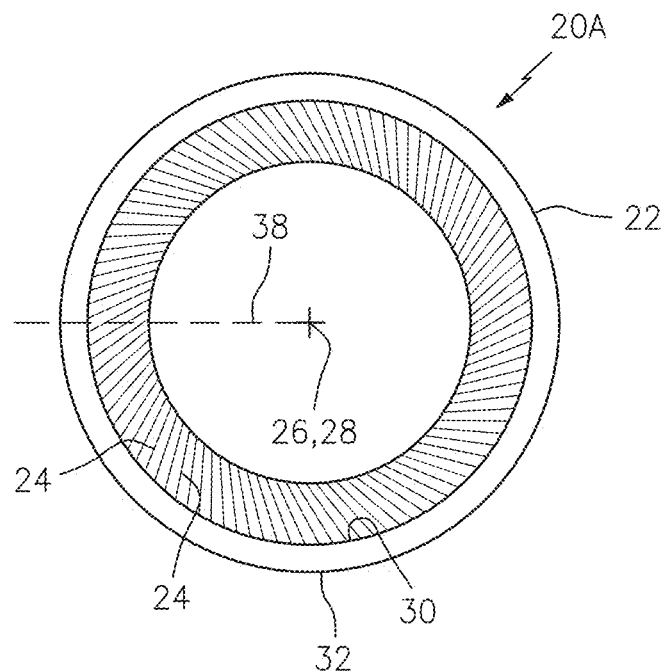
FIG. 1 is an illustration of a brush seal.

The present disclosure includes systems and methods for inspecting, inter alia, a brush seal 20; e.g., an annular (e.g., radial or axial) brush seal. Examples of various brush seals 20A-20C (generally referred to as "20") are illustrated in FIGS. 1-4. However, the present disclosure is not limited to any particular brush seal configuration. The present disclosure is also not limited to inspecting brush seals. The disclosed systems and methods, for example, may alternatively be implemented for inspecting bristles of various other devices such as, but not limited to, a brush of an electric motor.

Each of the exemplary brush seals 20 of FIGS. 1-4 includes an annular base 22 and a plurality of bristles 24; e.g., individual fibers, strands and/or lengths of material. The annular base 22 extends circumferentially around a center point 26 (e.g., a centroid) and/or an axial centerline 28 of the brush seal 20. The bristles 24 are connected to the base 22. The bristles 24, for example, may be welded, brazed, adhered and/or otherwise bonded to the base 22. The bristles 24 may also or alternatively be mechanically fastened (e.g., clamped) to and/or by the base 22. The bristles 24 project out from the base 22 to respective distal ends thereof. The bristles 24 of FIG. 1, for example, project radially inward from a radial inner periphery 30 of the base 22. The bristles 24 of FIG. 2 project radially outward from a radial outer periphery 32 of the base 22. The bristles 24 of FIGS. 3 and 4 project axially away from an axial side 34 of the base 22, which side 34 extends radially between the radial inner periphery 30 and the radial outer periphery 32.

Figure 2:
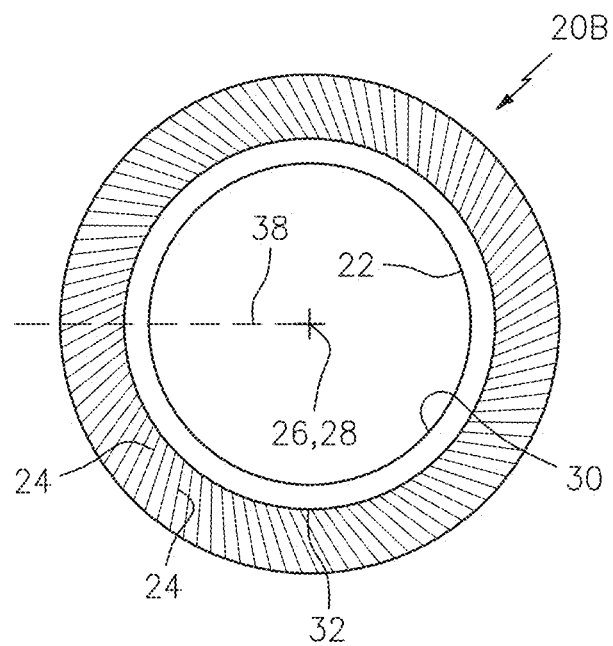
FIG. 2 is an illustration of another brush seal.
Figure 3:
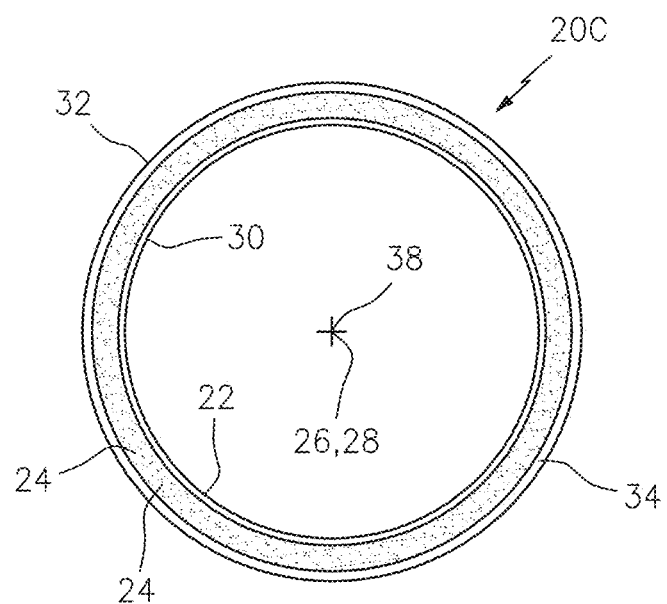
FIG. 3 is an illustration of still another brush seal.
Figure 4:
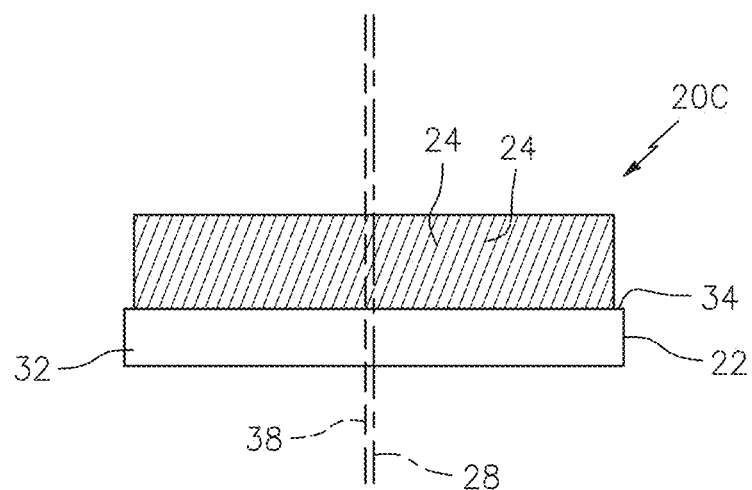
FIG. 4 is a side view illustration of the brush seal of FIG. 3.
Figure 5:
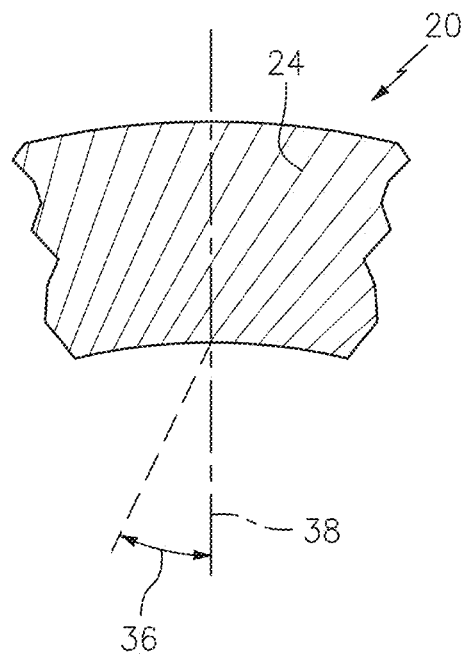
FIG. 5 is a partial illustration of a pack of bristles for a brush seal.
Figure 6:
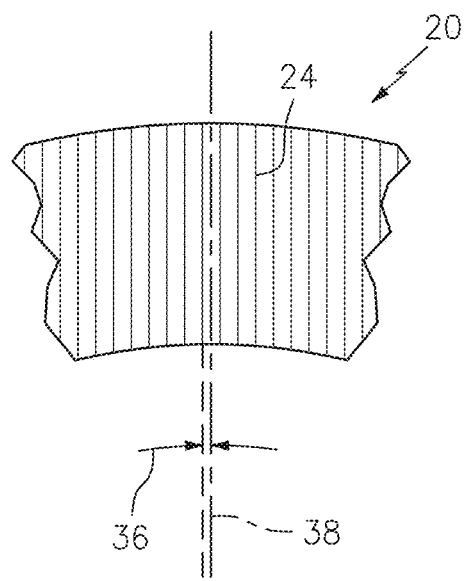
FIG. 6 is a partial illustration of another pack of bristles for a brush seal.

Referring to FIG. 5, each of the bristles 24 is oriented (e.g., angularly offset) at an angle 36 relative to a predetermined reference line 38. This angle 36 may be an acute angle (e.g., greater than zero degrees and less than ninety degrees); see also FIGS. 1-3. Alternatively, referring to FIG. 6, the angle 36 may be about zero or one-hundred and eighty degrees; e.g., the respective bristle 24 may be parallel with the reference line 38. In the embodiments of FIGS. 1 and 2, the reference line 38 is coincident with (e.g., extends though) the center point 26 and centerline 28. The reference line 38 may also perpendicular to the centerline 28. In the embodiment of FIG. 3, the reference line 38 is parallel with the centerline 28. The reference line 38 may also be coaxial with the centerline 28 as illustrated in FIGS. 3 and 4, or alternatively spatially offset from the centerline 28.

Figure 7:
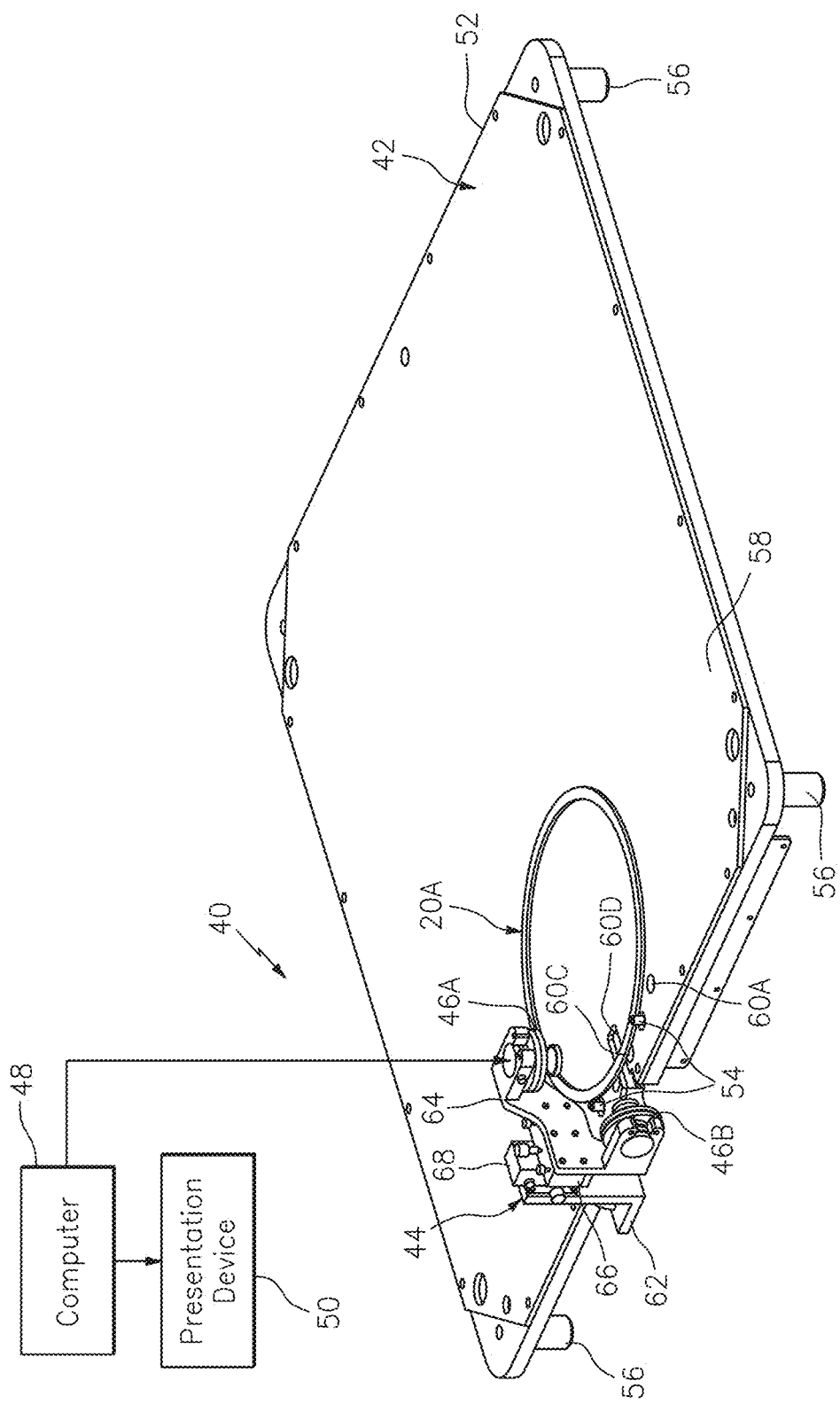
FIG. 7 is a perspective illustration of a system for inspecting a brush seal.

FIG. 7 illustrates an exemplary system 40 for inspecting a device with bristles (e.g., a brush seal), such as one of the brush seals 20 shown in FIGS. 1-3. However, for ease of description, the inspection system 40 of FIG. 7 is illustrated with the brush seal 20A. The inspection system 40 of FIG. 7 includes a brush seal support 42 (e.g., a brush seal fixture), a support stand 44, one or more cameras 46A and 46B (generally referred to as "46"), and a computer 48. The inspection system 40 may also include a presentation device 50.

Figure 8:
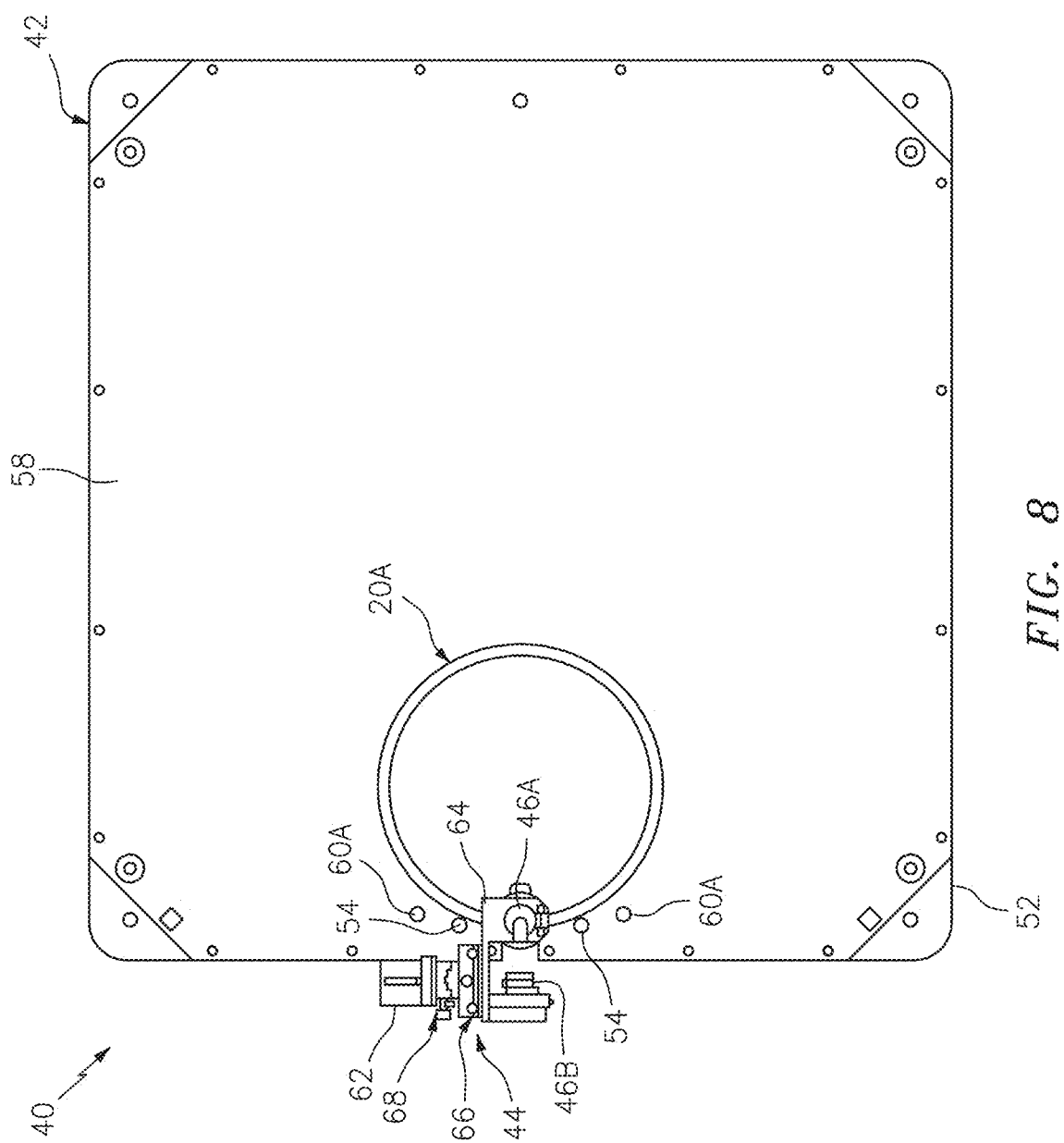
FIG. 8 is a top view illustration of the inspection system of FIG. 7.
Figure 9:
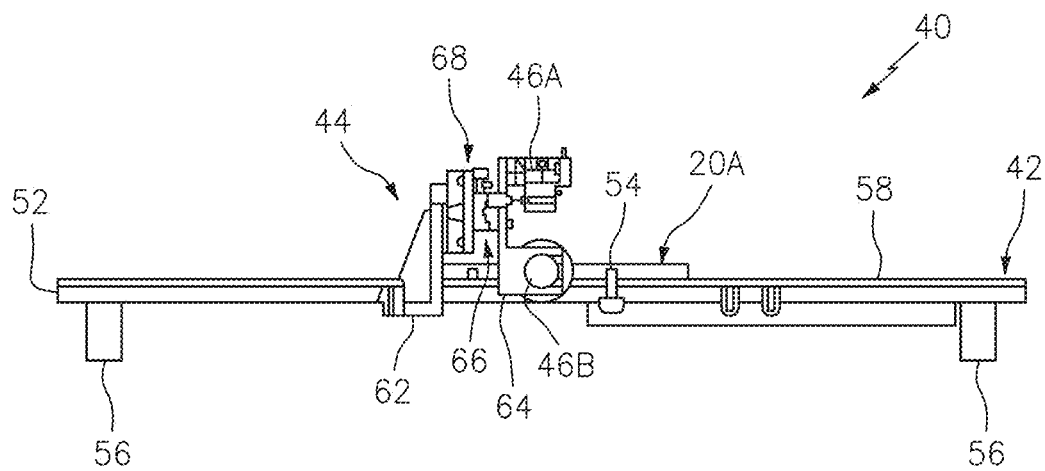
FIG. 9 is a side view illustration of the inspection system of FIG. 7.

Referring to FIGS. 7-9, the brush seal support 42 is configured to support and position the brush seal 20A during inspection of the brush seal 20A. The brush seal support 42 of FIGS. 7-9 includes a support base 52 and one or more brush seal locators 54.

The support base 52 may be configured as a substantially flat plate with (or without) one or more legs 56 on a bottom side of the support base 52. The support base 52 includes a support surface 58 (e.g., a substantially flat surface) on a top side of the support base 52, which top side is positioned opposite the bottom side. The support surface 58 is configured to support (e.g., hold) the brush seal 20A during inspection.

Figure 10:
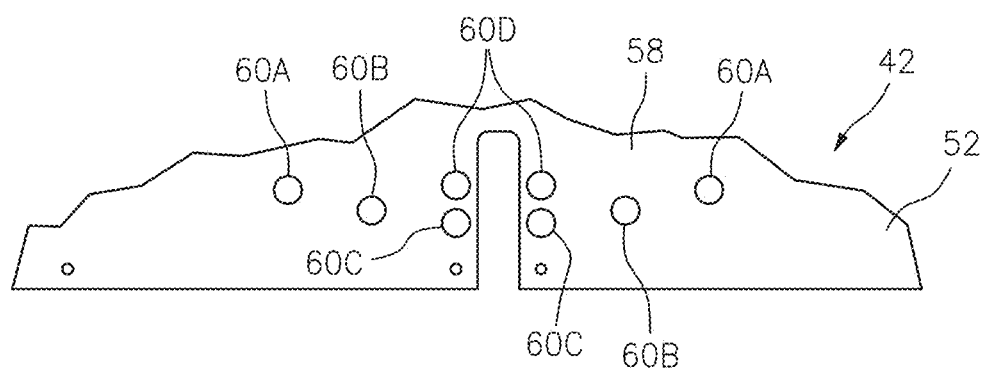
FIG. 10 is a partial top view illustration of a brush seal support for the inspection system of FIG. 7.

Each of the seal locators 54 may be configured as a protrusion such as, but not limited to, a projection, a columnar member, a peg, a pedestal and/or a roller. Each seal locator 54 of FIGS. 7 and 8, for example, projects out from the support surface 58 to a distal end of that respective seal locator 54. The seal locators 54 may be removably mated with (e.g., seated in/inserted into/plugged into) a respective one of a plurality of apertures 60A-D (generally referred to as "60") in the support base 52; see apertures 60 in FIG. 10. In particular, the seal locators 54 are adapted to be mated with select ones of the apertures 60 based on a configuration (e.g., size, shape, type, etc.) of the brush seal 20A. For example, where the brush seal 20A has a relatively large diameter, the first and the second seal locators 54 may be respectively mated with the outer apertures 60A. Where the brush seal 20A has a mid-sized diameter, the first and the second seal locators 54 may be respectively mated with the intermediate apertures 60B. Where the brush seal 20A has a relatively small diameter, the first and the second seal locators 54 may be respectively mated with one of the sets of the inner apertures 60C or 60D. Referring again to FIGS. 7 and 8, when mated with the appropriate apertures 60 for a respective brush seal configuration, the seal locators 54 are configured to position the brush seal 20A on the support surface 58 at a known/predetermined location and/or orientation. Thus, during inspection, the brush seal 20A is at a known/predetermine location and/or orientation within an inspection coordinate system.

The support stand 44 is connected to and/or otherwise configured with (e.g., positioned relative to) the brush seal support 42. The support stand 44 is configured to support the cameras 46. More particularly, the support stand 44 is configured to position the cameras 46 relative to the brush seal 20A. The support stand 44 of FIGS. 7 to 9, for example, includes a stand base 62, a camera carriage 64 and one or more track systems 66 and 68.

The first and the second cameras 46A and 46B are mounted to the camera carriage 64. In the specific embodiment of FIGS. 8, 9 and 11, the first camera 46A is positioned to face in a first direction towards the brush seal 20A that is perpendicular to the support surface 58. The second camera 46B is positioned to face in a second direction towards the brush seal 20A that is parallel to the support surface 58.

The first and the second track systems 66 and 68 couple the camera carriage 64 to the stand base 62, which is mounted to the brush seal support 42. In particular, the first track system 66 of FIGS. 8, 9 and 11 couples the camera carriage 64 to the second track system 68 and the second track system 68 couples the first track system 66 to the stand base 62.

Figure 11:
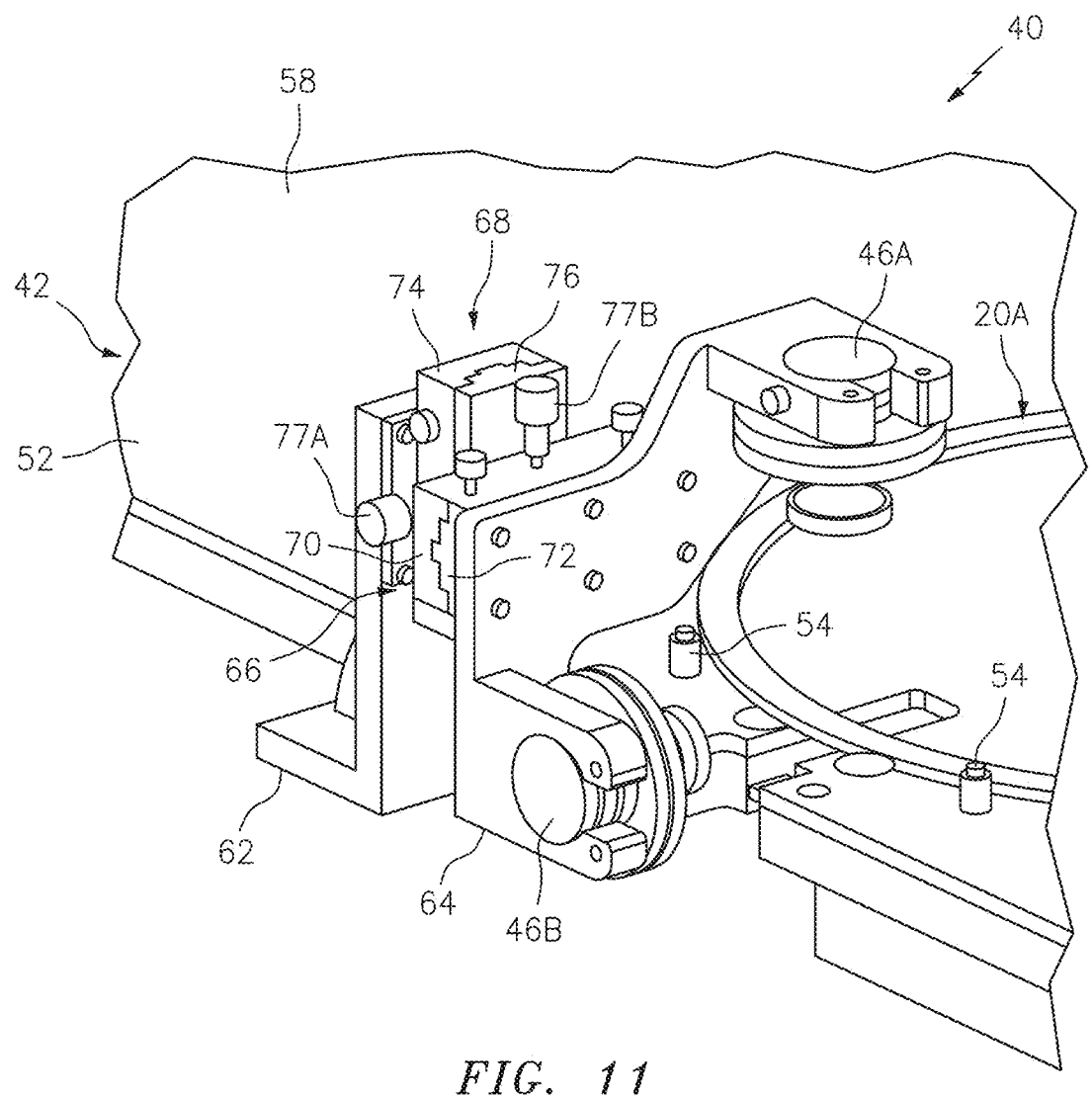
FIG. 11 is an enlarged view of a portion of the inspection system of FIG. 7.

Referring to FIG. 11, the first track system 66 includes a first track 70 and a first slider 72. This first slider 72 is adapted to slide along the first track 70 such that the camera carriage 64 and, thus, the cameras 46 may move back and forth in the second direction along a plane of the support surface 58. In the specific embodiment of FIG. 9, the first slider 72 is mounted to the camera carriage 64 and the first track 70 is mounted to the second track system 68. However, in alternative embodiments, the arrangement of the first track 70 and slider 72 may be reversed.

The second track system 68 includes a second track 74 and a second slider 76. This second slider 76 is adapted to slide along the second track 74 such that the camera carriage 64 and, thus, the cameras 46 may move in the first direction towards or away from the support surface 58. In the specific embodiment of FIG. 9, the second slider 76 is mounted to the first track system 66 (e.g., the first track 70) and the second track 74 is mounted to the stand base 62. However, in alternative embodiments, the arrangement of the second track 74 and slider 76 may be reversed.

Each of the cameras 46 may be configured as a digital camera with one or more electronic optical sensors.

The computer 48 is in signal communication with (e.g., hardwired and/or wirelessly connected to) each of the cameras 46. The computer 48 is thereby operable to receive image data from one or both of the cameras 46 during inspection. The computer 48 may also be in signal communication with an actuator 77A, 77B (generally referred to as "77") associated with each of the track systems 66 and 68. The computer 48 is thereby operable to automatically move the cameras 46 to an appropriate position for a respective brush seal being inspected. Of course, in other embodiments, the track systems 66 and 68 may be manually adjusted and configured without actuators. Still in other embodiments, one or more of the actuators 77 may each be configured for manual adjustment and, thus, not in signal communication with the computer 48; e.g., each actuator 77 may be configured as a knob or dial.

The computer 48 may be implemented with a combination of hardware and software. The hardware may include memory and at least one computer processor, which may include one or more single-core and/or multi-core processors. The hardware may also or alternatively include analog and/or digital circuitry other than that described above.

The memory is configured to store software (e.g., program instructions) for execution by the computer processor, which software execution may control and/or facilitate performance of one or more operations such as those described in the methods below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The presentation device 50 is in signal communication with the computer 48. The presentation device 50 is configured to convey (e.g., visually display, audibly produce, etc.) information received from the computer 48. Examples of the presentation device 50 include, but are not limited to, a displace screen, a printer, an indicator light and/or a speaker. While the presentation device 50 is illustrated as being discrete from the computer 48 in FIG. 7, in other embodiments the computer 48 and the presentation device 50 may be configured as a single unit; e.g., a laptop computer, a tablet computer, etc.

Figure 12:
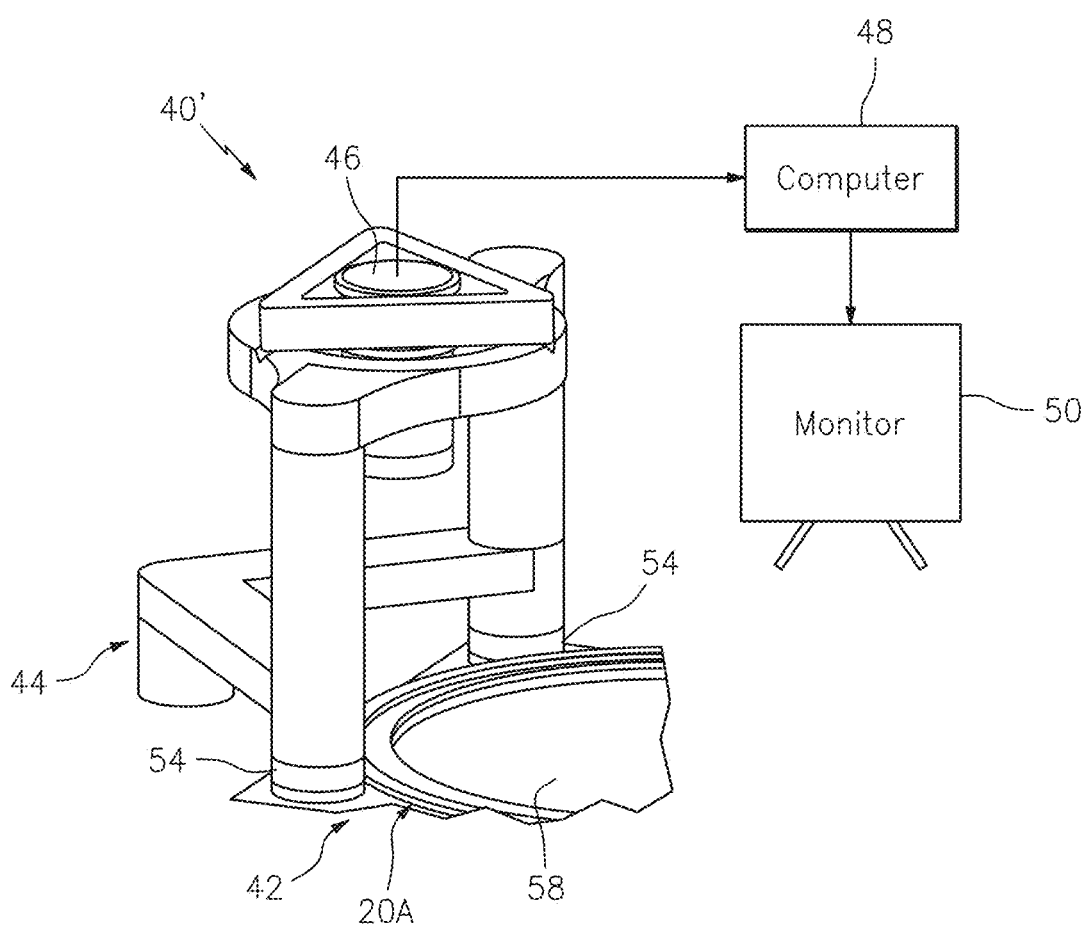
FIG. 12 is a partial perspective illustration of another system for inspecting a brush seal.

While FIGS. 7-11 illustrate an exemplary system 40 for inspecting a brush seal, the present disclosure is not limited to any particular inspection system configuration. For example, FIG. 12 illustrates another inspection system 40' which may be used for inspecting a brush seal 20 (e.g., 20A), or any other device with bristles, according to the present disclosure.

Figure 13:
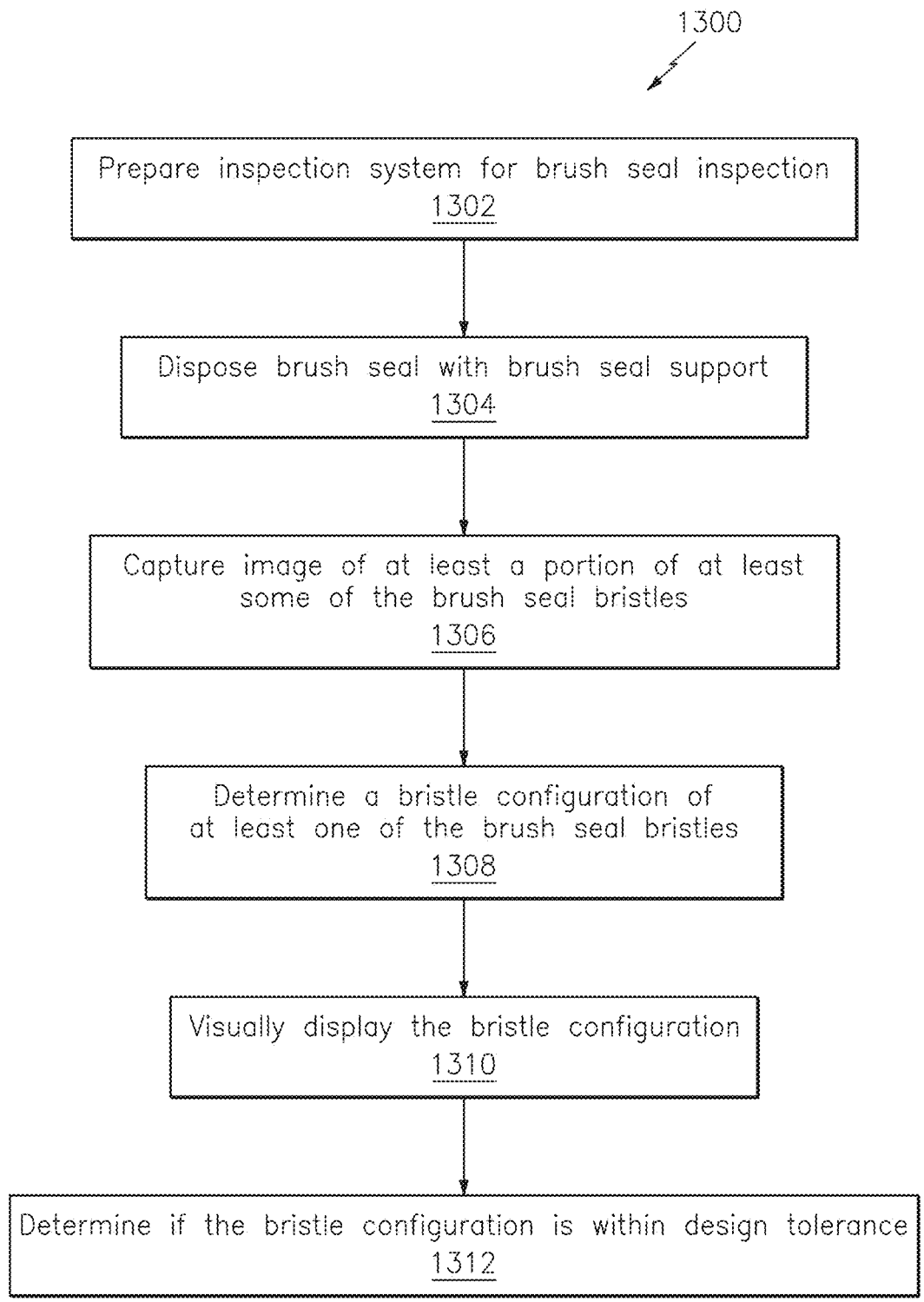
FIG. 13 is a flow diagram of a method for inspecting a device with bristles.

FIG. 13 is a flow diagram of a method 1300 for inspecting a device with bristles (e.g., a brush seal) such as, but not limited to, one of the brush seals 20 shown in FIGS. 1-3. This method 1300 may be performed using an inspection system such as, but not limited to, one of the systems 40 and 40' shown in FIGS. 7-12. However, for ease of description, the inspection method 1300 of FIG. 13 is described below with reference to the brush seal 20A of FIG. 1 and the inspection system 40 of FIGS. 7-11.

Figure 14:
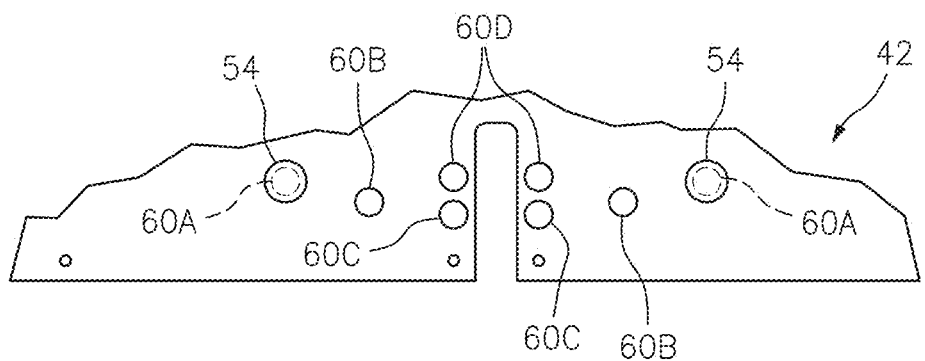
FIGS. 14 and 15 are additional partial top view illustrations of the brush seal support with different arrangements of seal locators.
Figure 15:
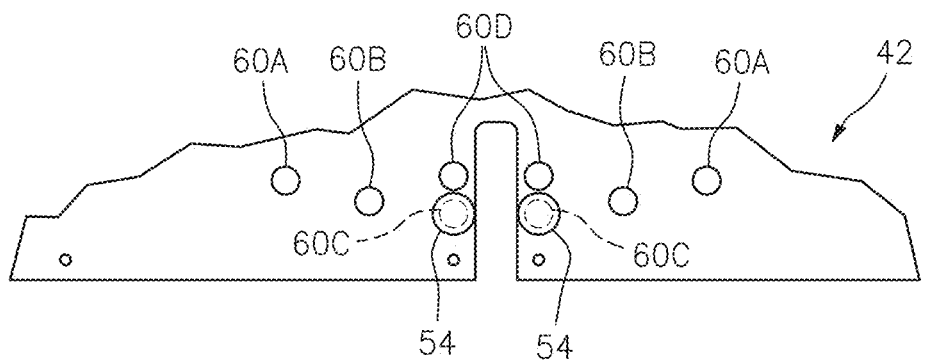

In step 1302, the inspection system 40 is prepared for the inspection of the brush seal 20A. One or more of the seal locators 54, for example, may be moved (e.g., rearranged) and mated with respective apertures 60 in the support base 52, which apertures 60 are selected based on the specific configuration (e.g., shape, size and/or type) of the respective brush seal 20A to be inspected. For example, where the brush seal 20A has a mid-sized diameter, the seal locators 54 may be mated with the intermediate apertures 60B as shown in FIG. 7 (aperture 60B best seen in FIG. 10). However, if the brush seal 20A had a relatively large diameter, the seal locators 54 may be mated with the outer apertures 60A as shown in FIG. 14 (apertures 60A best seen in FIG. 10). Alternatively, if the brush seal 20A had a relatively small diameter, the seal locators 54 may be mated with the inner apertures 60C (or alternatively 60D) as shown in FIG. 15 (apertures 60C best seen in FIG. 10). One or both of the track systems 66 and 68 of FIGS. 7 and 11 may also or alternatively be actuated to move one or both of the cameras 46 to respective positions which may also be selected based on the specific configuration of the respective brush seal 20A to be inspected. Of course, one or both of the cameras 46 may also or alternatively be moved during the inspection.

In step 1304, the brush seal 20A is disposed with the brush seal support 42; e.g., the fixture. The brush seal 20A, for example, may be placed on the support surface 58 and a radial outer peripheral edge of the brush seal 20A may be abutted radially against (e.g., contact) the seal locators 54. In this manner, the brush seal 20A may be positioned at a known/predetermined location and orientation.

Figure 16:
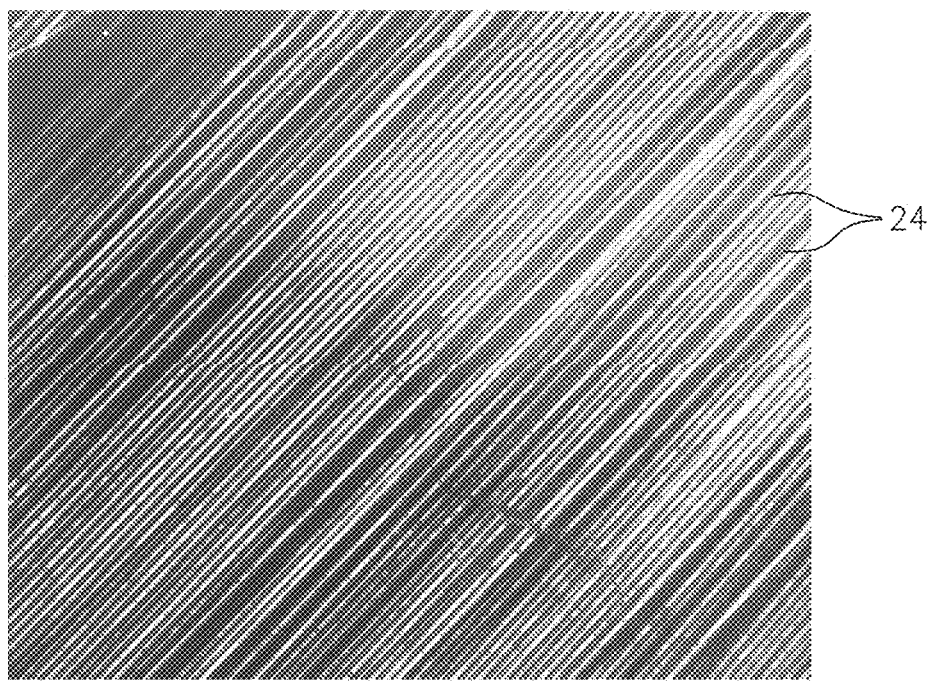
FIG. 16 is representation of a captured image of a portion of a plurality of brush seal bristles.

In step 1306, at least one of the cameras 46 captures an image of at least a portion of at least some of the bristles 24. An example of such an image is depicted in FIG. 16. The camera 46 then provides (e.g., generates and/or outputs) image data indicated of the captured image to the computer 48.

In step 1308, the computer 48 processes the image data to determine a bristle configuration of at least one of the bristles 24. The term "bristle configuration" may describe one or more parameters associated with a bristle such as, but not limited to, an orientation (e.g., angle and/or position) of a bristle, an angle of a bristle, a position of a bristle and/or a dimension (e.g., diameter, length) of a bristle. The at least one of the bristles 24 may be an actual one of the bristles 24 in the image. Alternatively, the at least one of the bristles 24 may be a representative bristle (e.g., representative of an average bristle). For example, the determined bristle configuration may represent an average bristle configuration (e.g., orientation and/or dimension) for a plurality of bristles 24 in the captured image.

Figure 17:
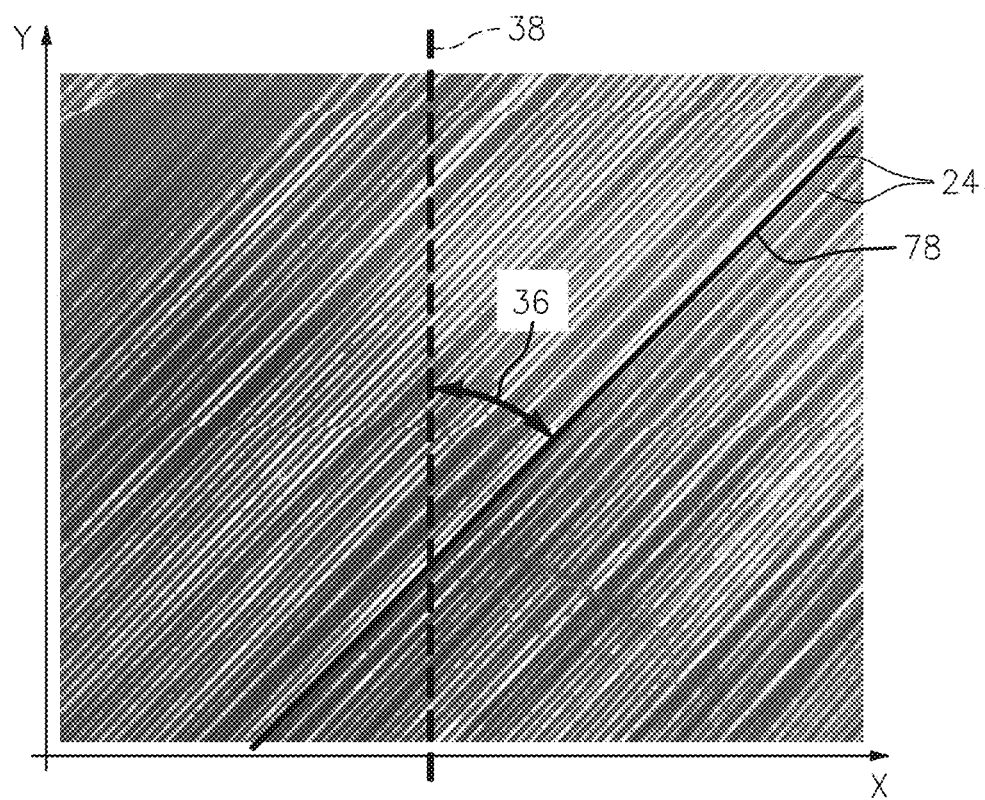
FIG. 17 is representation of the captured image of FIG. 16 during processing.

The bristle configuration may be indicative of at least (or only) the angle 36 between the at least one of the bristles 24 and a reference line as shown in FIG. 17. This reference line may be, but is not limited to, one of the reference lines 38 of FIGS. 1-6. The bristle configuration may also or alternatively be indicative of one or more other angles between the at least one of the bristles 24 and other respective reference lines and/or reference planes and/or surfaces of the brush seal 20A itself. The bristle configuration may also or alternatively be indicative of coordinates locating the at least one of the bristles 24 within a three dimensional space; e.g., the position of the at least one of the bristles 24. The bristle configuration may still also or alternatively be indicative of one or more dimensions (e.g., width/diameter and/or length) of the at least one of the bristles 24. The present disclosure, of course, is not limited to the forgoing exemplary bristle configurations. However, for ease of description, the bristle configuration is described below as being indicative of the angle 36 between the at least one of the bristles 24 and the reference line 38 shown in FIG. 17.

The computer 48 may utilize various different algorithms to process the image data and determine the bristle configuration of the at least one of the bristles 24. For example, the computer 48 and its processor may create a map of intensity values of the image in an x-y coordinate system; e.g., see FIG. 17. With this map of intensity values, the computer 48 may determine an average intensity value. The average intensity value substantially corresponds to an intensity at edges of each bristle 24 in the image. The computer 48 may thereby determine a first number (X) of the bristles 24 located along the x-axis within a determined quadrant (or an entirety) of the image. The computer 48 may also determine a second number (Y) of the bristles 24 located along the y-axis within the determined quadrant (or the entirety) of the image. These numbers may be found by interrogating the image intensity values along rows and columns respectively for instances where the intensity value of pixels crosses from below an average to above the average, or vice-versa. The computer 48 may then calculate an arctangent (arctan) of a bristle ratio (R), where the bristle ratio (R) is equal to a quotient of the second number (Y) divided by the first number (X). The arctangent (arctan) of the bristle ratio (R) may be equal to the angle 36 between the at least one of the bristles 24 and the reference line 38 shown in FIG. 17. In this specific example, the angle found is the average angle of all bristles in the image.

In another example, the computer 48 and its processor may utilize an autocorrelation function to determine the bristle configuration of the at least one of the bristles 24; e.g., the average angle of the bristles in the image. For example, the computer 48 may calculate an autocorrelation function on an array of pixels of the image. The computer 48 may determine a peak intensity of the autocorrelation function along each row (e.g., along the x-axis of FIG. 17) and/or along each column (e.g., along the y-axis of FIG. 17). The computer 48 may fit a least square error line based on the peak intensity x-y coordinate pairs. The computer 48 may then determine the average angle between all the bristles 24 and the reference line 38 shown in FIG. 17 based on a slope of the least square error line.

When prior knowledge exists about the angle to be measured, such as a possible range of values, a sampling of the autocorrelation function can substantially reduce the computations. For example, at a predetermined offset from center of image in the y-direction, the autocorrelation function is calculated for a specific range of x direction offsets where the peak autocorrelation function value is known to exist. A rough angle is calculated between the x and y location of the first peak and the 0 0 center. Along the line established by the rough angle, a set of x y coordinates is established as the expected peak autocorrelation function values. The autocorrelation function is calculated using a subset of either x or y offsets, for rows or columns respectively, to find the actual peak x y offset which is near the one established as the expected peak autocorrelation function value based on the rough angle estimate. Then analysis of the least square error line and slope may be the same as described above.

In step 1310, the presentation device 50 visually displays bristle configuration of the at least one of the bristles 24; e.g., the average angle of the bristles in the image. For example, where the presentation device 50 is a monitor, the angle 36 may be displayed on the monitor screen.

In step 1312, the computer 48 determines whether the determined bristle configuration of the at least one of the bristles 24 (e.g., the average bristle angle) is within design tolerance. For example, the computer 48 may compare the determined bristle configuration (e.g., the angle 36) to a predetermined baseline bristle configuration (e.g., angle 36). If the determined bristle configuration is different than the predetermined baseline bristle configuration, or outside a (e.g., plus and/or minus) tolerance range of the predetermined baseline bristle configuration, the computer 48 may determine the at least one of the bristles 24 (e.g., an average bristle) is outside tolerance. However, if the determined bristle configuration is equal to the predetermined baseline bristle configuration, or within the tolerance range of the predetermined baseline bristle configuration, the computer 48 may determine the at least one of the bristles 24 (e.g., an average bristle) meets tolerance. The results of this determination may also be visually displayed via the presentation device 50.

In some embodiments, the method 1300 may also be utilized to determine a dimension of the at least one of the bristles 24 (e.g., an average bristle) based on information determined about the angle 36. For example, if the size of the image is known, the dimensions of the at least one of the bristles 24 (e.g., an average bristle) can be determined based on the angle 36 and a count of the number of bristles along the y-axis and/or a count of the number of bristles along the x-axis using known geometric algorithms. Alternatively, the image may be rotated by the calculated angle. The dimensions of the at least one of the bristles 24 (e.g., an average bristle) can then be determined based on a count of the number of bristles along a single row (or column) using known geometric algorithms.

Figure 18:
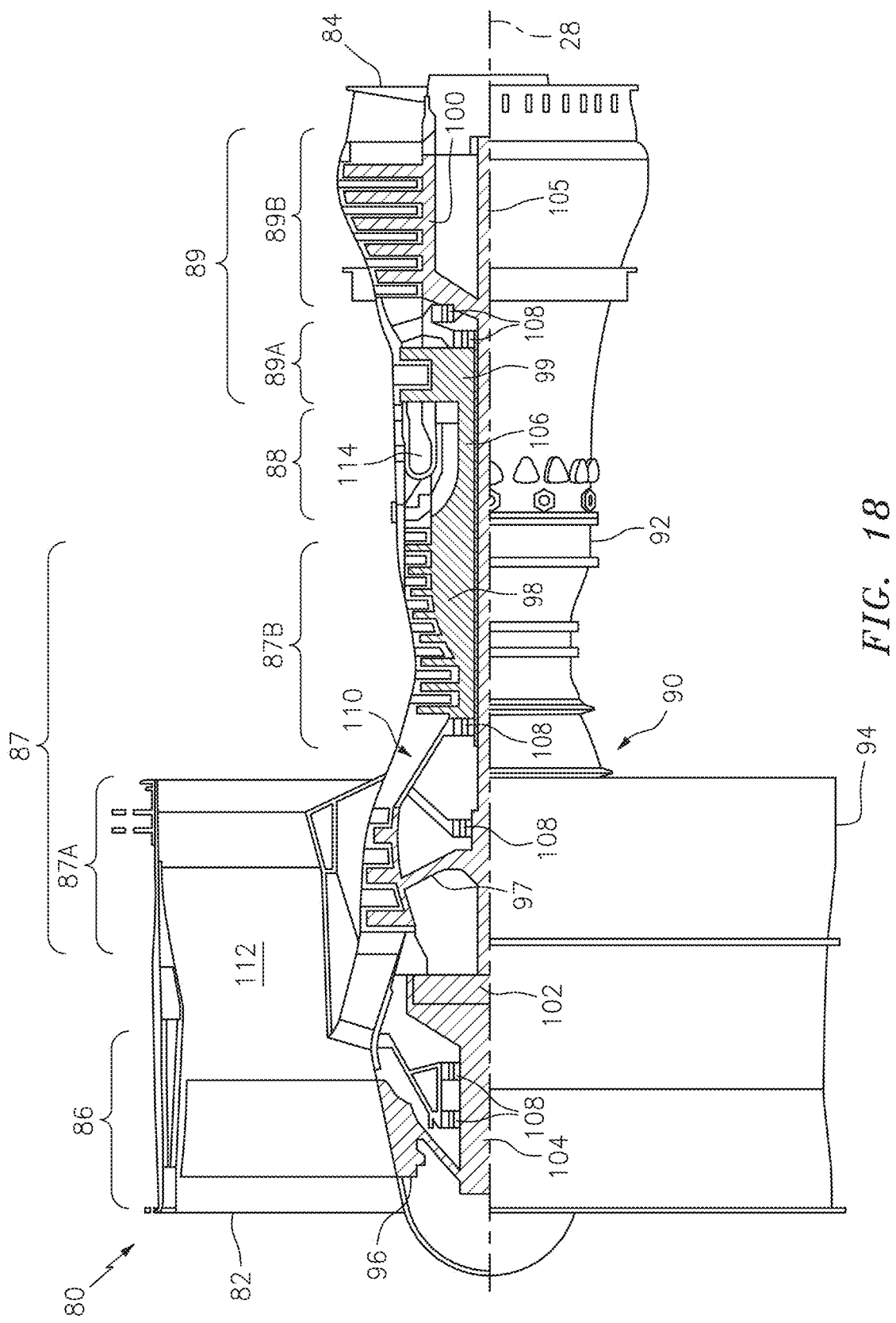
FIG. 18 is a side cutaway illustration of a geared turbine engine in which a brush seal may be included.

FIG. 18 is a side cutaway illustration of a geared turbine engine 80 in which the brush seal 20 may be configured. This turbine engine 80 extends along an axial centerline (e.g., the centerline 28) between an upstream airflow inlet 82 and a downstream airflow exhaust 84. The turbine engine 80 includes a fan section 86, a compressor section 87, a combustor section 88 and a turbine section 89. The compressor section 87 includes a low pressure compressor (LPC) section 87A and a high pressure compressor (HPC) section 87B. The turbine section 89 includes a high pressure turbine (HPT) section 89A and a low pressure turbine (LPT) section 89B.

The engine sections 86-89 are arranged sequentially along the centerline 28 within an engine housing 90. This housing 90 includes an inner case 92 (e.g., a core case) and an outer case 94 (e.g., a fan case). The inner case 92 may house one or more of the engine sections 87-89; e.g., an engine core. The outer case 94 may house at least the fan section 86.

Each of the engine sections 86, 87A, 87B, 89A and 89B includes a respective rotor 96-100. Each of these rotors 96-100 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 96 is connected to a gear train 102, for example, through a fan shaft 104. The gear train 102 and the LPC rotor 97 are connected to and driven by the LPT rotor 100 through a low speed shaft 105. The HPC rotor 98 is connected to and driven by the HPT rotor 99 through a high speed shaft 106. The shafts 104-106 are rotatably supported by a plurality of bearings 108; e.g., rolling element and/or thrust bearings. Each of these bearings 108 is connected to the engine housing 90 by at least one stationary structure such as, for example, an annular support strut.

During operation, air enters the turbine engine through the airflow inlet 82. This air is directed through the fan section 86 and into a core gas path 110 and a bypass gas path 112. The core gas path 110 extends sequentially through the engine sections 87A-89B; e.g., the engine core. The air within the core gas path 110 may be referred to as "core air". The bypass gas path 112 extends through a bypass duct, which bypasses the engine core. The air within the bypass gas path 112 may be referred to as "bypass air".

The core air is compressed by the compressor rotors 97 and 98 and directed into a combustion chamber 114 of a combustor in the combustor section 88. Fuel is injected into the combustion chamber 114 and mixed with the compressed core air to provide a fuel-air mixture. This fuel air mixture is ignited and combustion products thereof flow through and sequentially cause the turbine rotors 99 and 100 to rotate. The rotation of the turbine rotors 99 and 100 respectively drive rotation of the compressor rotors 98 and 97 and, thus, compression of the air received from a core airflow inlet. The rotation of the turbine rotor 100 also drives rotation of the fan rotor 96, which propels bypass air through and out of the bypass gas path 112. The propulsion of the bypass air may account for a majority of thrust generated by the turbine engine 80, e.g., more than seventy-five percent (75%) of engine thrust. The turbine engine 80 of the present disclosure, however, is not limited to the foregoing exemplary thrust ratio.

The brush seal 20 may be included in various turbine engines other than the one described above as well as in other types of rotational equipment. The brush seal 20, for example, may be included in a geared turbine engine where a gear train connects one or more shafts to one or more rotors in a fan section, a compressor section and/or any other engine section. Alternatively, the brush seal 20 may be included in a turbine engine configured without a gear train. The brush seal 20 may be included in a geared or non-geared turbine engine configured with a single spool, with two spools (e.g., see FIG. 18), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for inspecting a device comprising a plurality of bristles, the method comprising:
   arranging the device with a fixture to locate the device in a known spatial location and orientation;
   receiving image data provided from an electronic optical sensor, the image data indicative of an image of at least a portion of the bristles; and
   determining a bristle configuration of at least one of the bristles in the image by processing the image data with a computer processor, wherein the bristle configuration is determined based on the known spatial location and orientation, and the determining of the bristle configuration comprises determining an angle between the at least one of the bristles and a reference line;
   wherein the device further comprises an annular base that extends circumferentially around a centerline, and the plurality of bristles are connected to and project from the annular base.

2. The method of claim 1, wherein the reference line is coincident with and perpendicular to the centerline.

3. The method of claim 1, wherein the plurality of bristles project radially inward from a radial inner periphery of the annular base.

4. The method of claim 1, wherein the plurality of bristles project radially outward from a radial outer periphery of the annular base.

5. The method of claim 1, wherein the plurality of bristles project axially away from an axial side of the annular base.

6. The method of claim 1, wherein the electronic optical sensor is fixedly mounted to the fixture.

7. The method of claim 1, wherein the electronic optical sensor is mounted to the fixture, and the electronic optical sensor is adapted to move relative to the device.

8. The method of claim 7, further comprising adjusting the location of the electronic optical sensor based on a configuration of the device.

9. The method of claim 1, wherein the fixture comprises a first seal locator and a second seal locator, and the device is abutted against the first seal locator and the second seal locator.

10. The method of claim 9, further comprising adjusting a location of the first seal locator and/or a location of the second seal locator based on a configuration of the device.

11. The method of claim 1, wherein the bristle configuration is determined using an autocorrelation function.

12. The method of claim 1, wherein the bristle configuration further comprises a dimension of the at least one of the bristles.

13. The method of claim 1, wherein the device is configured as a brush seal for a gas turbine engine.

14. A method for inspecting a device comprising a plurality of bristles, the method comprising:
receiving image data provided from an electronic optical sensor, the image data indicative of an image of at least a portion of the bristles; and
determining a bristle configuration of at least one of the bristles in the image by processing the image data with a computer processor, wherein the determining of the bristle configuration comprises determining an angle between the at least one of the bristles and a reference line, and the determining of the bristle configuration further comprises:
calculating an autocorrelation function on an array of pixels of the image;
determining a peak intensity of the autocorrelation function along each row or each column of the array of pixels;
fitting a least square error line based on the peak intensity; and
determining the angle based on a slope of the least square error line;
wherein the device further comprises an annular base that extends circumferentially around a centerline, and the plurality of bristles are connected to and project from the annular base.

15. The method of claim 14, wherein the plurality of bristles project one of
radially inward from a radial inner periphery of the annular base; and
radially outward from a radial outer periphery of the annular base.

16. The method of claim 14, wherein the plurality of bristles project axially away from an axial side of the annular base.

17. A method for inspecting a device comprising a plurality of bristles, the method comprising:
receiving image data provided from an electronic optical sensor, the image data indicative of an image of at least a portion of the bristles; and
determining a bristle configuration of at least one of the bristles in the image by processing the image data with a computer processor, wherein the determining of the bristle configuration comprises determining an angle between the at least one of the bristles and a reference line, and the determining of the bristle configuration further comprises:
determining a first number of the plurality of bristles located along an x-axis in a quadrant of the image;
determining a second number of the plurality of bristles located along a y-axis in the quadrant of the image; and
calculating an arctangent of R to determine the angle, wherein R is equal to a quotient of the second number divided by the first number;
wherein the device further comprises an annular base that extends circumferentially around a centerline, and the plurality of bristles are connected to and project from the annular base.

18. The method of claim 17, wherein the plurality of bristles project one of
radially inward from a radial inner periphery of the annular base; and
radially outward from a radial outer periphery of the annular base.

19. The method of claim 17, wherein the plurality of bristles project axially away from an axial side of the annular base.

20. The method of claim 17, wherein the device is configured as a brush seal for a gas turbine engine.

* * * * *